Feb. 7, 1961  W. J. CRUMP  2,970,367
METHOD OF MOUNTING BALANCED ROTOR BLADES
Filed Sept. 3, 1957
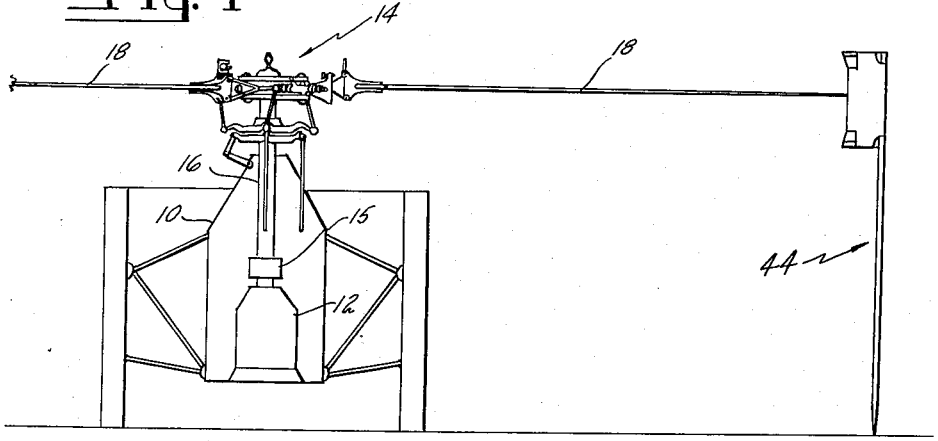
Fig. 1
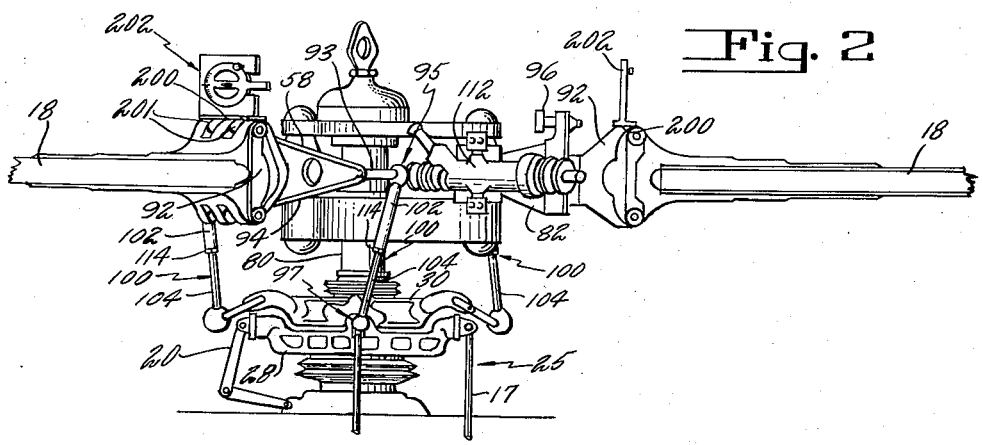
Fig. 2
Fig. 3
INVENTOR
WALTER J. CRUMP
BY Jack N. McCarthy
AGENT

United States Patent Office 2,970,367
Patented Feb. 7, 1961

2,970,367

METHOD OF MOUNTING BALANCED ROTOR BLADES

Walter J. Crump, Milford, Conn., assignor to United Aircraft Corporation, East Hartford, Conn., a corporation of Delaware Filed Sept. 3, 1957, Ser. No. 681,548

5 Claims. (Cl. 29—156.8)

This invention relates generally to direct lift aircraft having a supporting rotor or rotors which may be power driven and more particularly to a means and method for the elimination of main rotor blade tracking of the type including measuring blade tip path on an aircraft after the blades have been installed.

An object of this invention is to provide a device which will permit main rotor blades to be installed on a rotary wing aircraft in such a position so as to eliminate the requirement for blade tracking.

Another object of this invention is to provide measuring means for the blades on the test stand and on the aircraft so as to be able to read the pitch angle of each blade. This reading will indicate the pitch angle of the blade taken to a reference plane.

A further object of this invention is to use a protractor for each blade or sleeve on the test stand and on the aircraft so as to be able to read the pitch angle of each blade.

Another object of this invention is to provide a device which will permit interchangeability between production blades on a helicopter without requiring blade tracking on the helicopter.

A further object of this invention is to provide for rotor blade installation which will not involve expensive tooling or many aircraft changes.

Other objects and advantages will be apparent from the specification and claims and from the accompanying drawings which illustrate an embodiment of the invention.

In the drawings:

Fig. 1 is a view showing a test stand having a rotor with the position of the tip of one blade being measured with respect to the others by the use of a tracking flag.

Fig. 2 is a side view of a rotor head linkage including both the collective and the cyclic pitch control.

Fig. 3 is an enlarged view of a protractor placed on the blade attaching sleeve.

In helicopters and other rotary wing aircraft, it is important that the several blades rotate within a cone of revolution, and that each blade follows substantially a path on the surface of this cone. In the event that one or more blades rides above or below this cone, a cyclic vibration will occur which will vibrate the rotor shaft and transmit vibrations to the control mechanism and to the craft. For this reason, it is desirable that one blade follow as closely as possible exactly the same path as another.

The test stand, shown in Fig. 1, comprises a main unit 10 containing an engine 12 driving a rotor 14 through a transmission 15 and shaft 16. This portion of the test stand can be similar to that used to power a helicopter.

The rotor 14, as shown in Figs. 1 and 2, is set forth more in detail in United States Patent No. 2,638,994 to M. D. Buivid. This rotor has blades 18 attached thereto each by a flapping link 82 on which a blade attaching sleeve 92 is journalled for rotation to vary the pitch of each of the blades. A flat surface 200 is formed on each blade attaching sleeve to permit a protractor 202 to be placed thereon to determine the angle of the sleeve with some reference. While this surface may be formed in a number of places on a sleeve, for this application it has been shown as a machined surface on the top of blade attaching fingers 201. The protractor 202 can be of the type having a level indicator 203 to provide easy angular reference to a level plane. While a locking screw 205 is used to lock the protractor, any other means can be used. A handle 206 is used to reset the movable inner annular member 207. Inboard of the blade attaching sleeve 92 a blade pitch changing horn 94 is journalled or attached. Each sleeve 92 is fixed relative to its cooperating horn 94 by a slidable locking pin 96. Each flapping link 82 is mounted for rotation about a drag hinge 58 to provide for lag and lead movements of each blade. A damper 112 is provided to permit proper damping of movement of the blade around this axis.

Each blade pitch changing horn 94 has an extension 93 extending therefrom. Control of each blade pitch is obtained in a usual manner through a push-pull or connecting rod 100 which is connected at one end by a universal joint 95 to a free end of each extension 93 and connected at its other end by a universal joint 97 to an arm extending from a rotatable swash plate member 30. Each universal joint is shown in a rubber casing or cover. A stationary swash plate 28 is mounted below the rotating swash plate 30 in the usual manner to provide for actuation of said rotating swash plate. Stationary swash plate 28 is fixed against rotation in relation to said aircraft by a scissors 20.

Total pitch or collective pitch change is obtained by a movement of the swash plates 28, 30 in an axial direction along the rotor shaft 80. Cyclic pitch is obtained by a tilting of the swash plates 28, 30. This axial or tilting movement of the swash plates to obtain collective or cyclic pitch control is transmitted to the swash plates from usual control devices through connecting rods 17. One control linkage for properly positioning the swash plates to obtain a desired helicopter control is shown in United States Patent No. 2,599,690 to M. D. Buivid et al.

Each push-pull or connecting rod 100 is adjustable in length. A push-pull rod comprises a cylindrical member 102 internally threaded for a portion of its length from one end with a rod member 104 threadably positioned therein. A lock nut 114 is provided between rod member 104 and member 102 to fixedly position said rod in relation to cylindrical member 102. Each free end of a member 102 has a universal connection 95 with its cooperating extension 93 extending from a blade pitch changing horn 94 and each free end of a member 104 has a universal connection 97 with its cooperating arm extending from swash plate 30.

The tracking device 44, shown in Fig. 1, is a blade tip indicating device which is used for tracking and is more fully described in United States Patent No. 2,552,739 to Reon B. Roberts for Method of Tracking Rotor Blades.

Operation

In preparing production blades for use on helicopters in which the subject invention is utilized to permit interchangeability, the following procedure is used: (1) Production blades are mounted in position on a test stand along with a master blade. (2) The test stand is placed in operation rotating the blades to be balanced while the blade pitch control linkage is held at a predetermined position. This may be done by pins or any other desirable means. (3) The blades are then balanced dynamically and aerodynamically with a master blade or reference always keeping the blades in track such as by the method shown in the United States Patent No. 2,759,359 to H. T. Jensen et al., the push-pull rods for the blades being balanced requiring adjustment throughout this procedure. (4) When the blades have been dynamically and aerodynamically balanced and are in perfect track with the master or reference blade, a protractor or angle measuring device is used to determine the angle difference now existing between the production blades and the master blade. This measurement must be made in a precise manner thus: (*a*) Position master blade over a reference point previously established. (*b*) Determine the exact angle of master sleeve with protractor. (*c*) Position each other blade over same reference point and determine angle variance from master. This variance is marked on its respective attached blade. These blades may then be taken off the test stand and stored or properly set aside until their use is desired on an aircraft. Another set of blades can then be placed on the test stand and balanced in the same manner to the same master blade or reference. Any number of production blades balanced against the same master blade will be fully interchangeable with each other on any aircraft.

In placing tracked production blades which have been balanced on the test stand by this method into position on a helicopter, the angle variance must be applied to the attaching sleeves. Select a group of blades to be installed and note the angle variance marked on each blade, for example, three blades marked +.3°, —.2°, —.1°. Select one of these blades to be installed on a first rotor hub as this will determine the angle settings to be made to the second and third hub. For example, if No. 1 blade has angle variance marked +.3° and No. 2 blade has angle variance marked —.2° and No. 3 blade has angle variance marked —.1° then the respective sleeve attachment angles will be adjusted thus: No. 2 must be .5° less than No. 1 and No. 3 must be .4° less than No. 1. This is accomplished as follows: (1) Lock the cyclic and collective pitch controls in a fixed position by suitable pins, clamps, etc. (2) Turn rotor so that a first attaching sleeve is directly over a reference point on the helicopter. (3) Place a protractor on the surface 200 of said sleeve and determine its angle, for example 6°. (4) Now rotate the rotor until No. 2 attaching sleeve is directly over reference point referred to above. (5) A protractor is then placed on the surface 200 of said second sleeve and the blade sleeve is set .5° lower than said first sleeve or 5.5°. (6) Again rotate rotor until the No. 3 attaching sleeve is directly over the reference point. (7) The above procedure is followed on said No. 3 sleeve and its angle adjusted to 5.6°.

It is to be understood that the invention is not limited to the figures herein shown and described, but may be used in other ways without departure from its spirit as defined in the following claims.

I claim:

1. The method of balancing and mounting blades whose dynamic and aerodynamic balance may vary for installation on rotary wing aircraft having blade pitch controls comprising the steps of, dynamically and aerodynamically balancing each blade until it tracks with a reference, after balancing and blades are in track measuring the pitch angle of each blade, recording on each balanced blade the angular measurement of each blade to a reference, mounting blades so measured on a rotary wing aircraft, maintaining said blade pitch controls in a locked position, placing a first blade over a reference point, measuring the pitch angle of said blade, placing a second blade over said reference point and adjusting its pitch angle at that point to include the previously determined differential angular measurement between the recorded measurement on the first blade and the second blade, placing each other blade over said reference point and adjusting its pitch angle at that point to include the previously determined differential angular measurement between the recorded measurement on the first blade and the blade being mounted.

2. The method of balancing and mounting blades whose dynamic and aerodynamic balance may vary for installation on rotary wing aircraft having blade pitch controls comprising the steps of, dynamically and aerodynamically balancing each blade until it tracks with one of said blades as a reference, after balancing and blades are in track measuring the pitch angle of each blade, recording on each balanced blade the angular measurement of each blade to a reference, mounting blades so measured on a rotary wing aircraft, maintaining said blade pitch controls in a locked position, placing said one blade selected as a reference over a reference point, measuring the pitch angle of said blade, placing a second blade over said reference point, adjusting the pitch angle of said second blade at that point to include the previously determined differential angular measurement between the recorded measurement on the blade selected as a reference and the second blade, placing each other blade over said reference point and adjusting its pitch angle at that point to include the previously determined differential angular measurement between the recorded measurement on the blade selected as a reference and the blade being mounted.

3. The method of balancing and mounting blades whose dynamic and aerodynamic balance may vary for installation on blade attaching sleeves of a rotary wing aircraft having blade pitch controls comprising the steps of, dynamically and aerodynamically balancing each blade until it tracks with a reference, after balancing and blades are in track measuring the pitch angle of each blade, recording on each balanced blade the angular measurement of each blade to a reference, maintaining said blade pitch controls in a locked position, placing a first blade attaching sleeve over a reference point, measuring the pitch angle of said blade, mounting a balanced blade on said sleeve, placing a second sleeve over said reference point and adjusting its pitch angle at that point to include the previously determined differential angular measurement between the recorded measurement on the blade selected to cooperate with said first sleeve and the blade selected to cooperate with said second sleeve, mounting the blade selected to cooperate with said second sleeve on said second sleeve, placing each other blade sleeve over said reference point and adjusting its pitch angle at that point to include the previously determined differential angular measurement between the recorded measurement on the blade selected to cooperate with said first sleeve and the blade selected to cooperate with the respective sleeve being adjusted, mounting each of said other blades selected to cooperate with a blade sleeve on its respective sleeve.

4. The method of balancing and mounting blades whose dynamic and aerodynamic balance may vary for installation on rotary wing aircraft having blade pitch controls comprising the steps of, dynamically and aerodynamically balancing each blade until it tracks with a reference, after balancing and blades are in track measuring the pitch angle of each blade, recording on each balanced blade the angular measurement of each blade to a reference, mounting blades so measured on a rotary wing aircraft, maintaining said blade pitch controls in a locked position, placing a first blade over a reference point, positioning said first blade pitch angle to incorporate the angular measurement recorded on said blade, placing a second blade over said reference point, positioning said second blade pitch angle to incorporate the angular measurement recorded on said second blade, placing each other blade over said reference point, positioning each of said other blades pitch angle to incorporate the angular measurement recorded on the respective blade being positioned.

5. The method of balancing and mounting blades whose dynamic and aerodynamic balance may vary for installation on rotary wing aircraft having blade pitch controls comprising the steps of, dynamically and aerodynamically balancing each blade until it tracks with a reference blade, after balancing and blades are in track measuring the pitch angle of each blade, recording on each balanced blade the angular difference of each blade from that of the reference blade, mounting blades so measured on a rotary wing aircraft, maintaining said blade pitch controls in a locked position, placing a first blade so recorded over a reference point, measuring the pitch angle of said blade, placing a second blade over said reference point and adjusting its pitch angle at that point to include the previously determined differential angular measurement between the recorded measurement of the first blade and the second blade, placing each other blade over said reference point and adjusting its pitch angle at that point to include the previously determined differential angular measurement between the recorded measurement of the first blade and the blade being mounted.

References Cited in the file of this patent

UNITED STATES PATENTS

| | | |
|---|---|---|
| 2,394,766 | Halford | Feb. 12, 1946 |
| 2,432,673 | Milner | Dec. 16, 1947 |
| 2,434,506 | Milner | Jan. 13, 1948 |
| 2,669,120 | Jensen et al. | Feb. 16, 1954 |